3,436,377
POLYMERS WITH HIGH HEAT DISTORTION TEMPERATURES PREPARED FROM EPOXYPOLYBUTADIENE HARDENED WITH POLYOLS AND ANHYDRIDES
Walter Dittmann and Horst Krämer, Marl, Germany, assignors to Chemische Werke Huls A.G., Marl, Germany
No Drawing. Filed July 16, 1965, Ser. No. 472,693
Claims priority, application Germany, July 21, 1964,
C 33,456
Int. Cl. C08g 23/06, 23/22
U.S. Cl. 260—78.4     12 Claims

ABSTRACT OF THE DISCLOSURE

A hardened polymer particularly useful for coatings, said polymer comprising a hardener such as a polybasic carboxylic acid or anhydride, and an epoxidized polybutadiene having a degree of epoxidation of at least 60% of the double bonds, corresponding to at least 15% by weight of oxygen, and being produced from a liquid polybutadiene having at least 60% of its double bonds in the cis-configuration and a molecular weight of about 250 to 25,000.

---

This invention relates to improved epoxy polymers based on polybutadiene epoxides, and in particular to such polymers wherein the starting polybutadiene epoxide has a relatively high content of epoxide oxygen situated in a specific position within each monomeric unit. Such epoxy polymers exhibit relatively high distortion temperatures, as compared to prior art products.

Epoxy resins of various types are widely used in industry. Such resins are usually cross-linked by the addition of a hardener which is usually a compound having a plurality of functional groups containing reactive hydrogen atoms. As polyfunctional compounds, for example, it has been suggested to employ polybasic carboxylic acids or their anhydrides, in the optional presence of polyhydric alcohols. This cross-linking or hardening of the epoxy resins is often called "acid hardening"; and when it is conducted with the application of heat, it is called "thermal hardening" or the like.

The most common type of hardenable epoxy resins are this based on dihydroxy-diphenyl alkanes, such as Bisphenol-A and epichlorohydrin. A more recent type of epoxy resin is based on the epoxidation of diolefins such as the tetrahydrobenzyl ester of tetrahydrobenzoic acid.

An even more recent development in the formulation of epoxy resins is based on the epoxidation of low molecular weight, liquid polydienes such as liquid polybutadienes or copolymers of butadiene with monounsaturated olefins, as disclosed in German Patent No. 1,040,794 and in German published application 1,135,170. A commercial species of this relatively new group is known as Oxiron 2000. This type of epoxy resin based on polymers of butadiene exhibits good mechanical properties; but they leave something to be desired with respect to their dimensional stability at temperatures exceeding the boiling point of water.

An object of this invention, therefore, is to provide improved epoxy polymers based on polybutadiene which possess better dimensional stability at higher temperatures, i.e., higher heat distortion temperatures.

A further object of this invention is to provide systems of hardener with epoxy resin which possess both good mechanical properties and high heat distortion temperatures.

Upon further study of the specification and claims, other objects and advantages of the present invention will become apparent.

To attain the objects of this invention, it has been discovered that epoxy resins having relatively high heat distortion temperatures can be obtained if the epoxidized polymer of butadiene has the following characteristics:

(a) The starting material is a liquid butadiene having a molecular weight of about 250 to 25,000 preferably 1,000 to 5,000, and at least 60%, preferably at least 70% of the double bonds therein are centrally positioned cis-double bonds;

(b) At least 60% of the double bonds in the polybutadiene are epoxidized, corresponding to an oxygen content of at least 15%;

(c) The epoxidized polybutadiene is cross-linked with one or more hardening agents which are preferably polybasic carboxylic acids or anhydrides thereof, said cross-linking being conducted in the optional presence of one or more polyhydric alcohols.

To produce the polybutadiene epoxides, it is possible to employ any conventional process such as the reaction of a carbon-to-carbon double bond with a peracid, preferably an organic peracid. In this connection, the desired degree of epoxidation can be obtained by merely adding the desired stoichiometric quantity of the peracid—the larger the quantity of peracid, the higher the degree of epoxidation.

The structure of the epoxidized polybutadiene is such that oxygen is added to the double bonds in this manner:

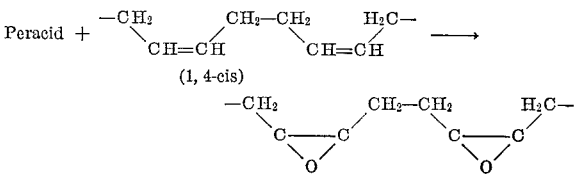

Thus, at least 20%, preferably 30–90% of the polybutadiene epoxide exhibits the structure on the right-hand side of the equation. The oxygen content of the polybutadiene-epoxide of this invention may range between 15 and 23% by weight, corresponding to a degree of epoxidation of the double bonds between 60 and 100%. The viscosities of the polybutadienepoxides increase relative to the raising degree of epoxidation.

Epoxidizing a polybutadiene of the invention having a viscosity of ca. 150–200 centipoise (at 50° C.) to various degrees of epoxidizing there are resulting the following viscosities of the epoxides:

| Degree of epoxidizing (percent of the double bonds): | Viscosities of the polybutadieneepoxides at 50° C. in centipoises |
|---|---|
| 60 | ca.  8,000 |
| 70 | ca.  50,000 |
| 80 | ca. 100,000 |

Products of viscosities up to $2 \cdot 10^6$ centipoises (at 50° C.) can be cured advantageously.

For cross-linking or hardening, the polybutadiene epoxide is mixed with the hardener at a preferably relatively low temperature, particularly below 100° C. The mixture (without a solvent) is then introduced into molds in order to shape the mixture, and the resultant shaped article is then hardened by heating. For the production of objects coated with the epoxy resin of this invention, the resin is dissolved in a suitable solvent, and the resultant solution is applied to the surface to be coated.

The boiling point of the solvent is preferably such that the solvent is evaporated either before or just after the coating begins to harden.

For hardening the polybutadiene epoxides, preferred polybasic carboxylic acids are, for example, aliphatic dicarboxylic acids, such as oxalic acid, succinic acid, adipic acid, sebacic acid, decamethylene dicarboxylic acid, aliphatic hydroxydicarboxylic acids, such as malic acid and tartaric acid, unsaturated aliphatic dicarboxylic acids, such as fumaric acid and maleic acid, cycloaliphatic dicarboxylic acids, such as tetrahydrophthalic acid, hexahydrophthalic acid, endomethylene tetrahydrophthalic acid, aromatic polycarboxylic acids, such as phthalic acid, trimellitic acid, pyromellitic acid, and chlorinated dicarboxylic acids, such as tetrachlorophthalic acid and HET acid (hexachloro-endomethylene-tetrahydrophthalic acid). In general, the polybasic acid contains 2 to 4 carboxyl groups and 2 to 12 carbon atoms.

Suitable acid anhydrides include, for example, maleic acid anhydride, succinic acid anhydride, tetrahydrophthalic acid anhydride, endomethylene-tetrahydrophthalic acid anhydride, hexahydrophthalic acid anhydride, and HET acid anhydride, as well as anhydrides of the previously mentioned acids.

The compounds which are suitable for hardening the polybutadiene epoxide of the invention are preferably utilized in mixtures.

Acid anhydrides by themselves are less suitable for hardening, because the number of hydroxyl groups contained in the polybutadiene epoxide is not sufficient for initiating the hardening process. Consequently, compounds having additional hydroxyl groups are preferably added, in particular polyhydric alcohols, for example ethylene glycol, propylene glycol, diethylene glycol, 1,4-butanediol, glycerin, and erythritol. In general, such alcohols contain 2 to 4 hydroxy groups and 2 to 12 carbon atoms. Among the suitable hardener mixtures are, for example, mixtures of maleic acid anhydride or hexahydrophthalic acid anhydride with propylene glycol or glycerin. The weight ratio of anhydride to alcohol is usually about 1:0.1 to about 1:1, respectively.

Mixtures also have the additional advantage that they have a relatively low melting point or are liquid at room temperature, thereby being easily miscible with the polyepoxide to be hardened.

The quantity of the hardening substance to be employed is variable within wide limits. Normally, 0.6 to 1 equivalent, based on reactive hydrogen, of the hardening substance is utilized per epoxide group.

Depending upon whihc hardener is selected, the hardening process is preferably conducted at about 20 to 120° C. For posthardening of the obtained moldings or coatings, they are heated generally to temperatures above 120° C., preferably to temperatures in the range of between 120 and 200° C. By using maleic acid or the anhydride thereof as the hardener, it is possible to utilize low hardening temperatures, which can be, of course, a substantial advantage for some applications. Such cold hardening can otherwise be achieved only when hardening with amines.

Without further elaboration, it is believed that one skilled in the art can, using the preceding description, utilize the present invention to its fullest extent. The following preferred specific embodiments are, therefore, to be construed as merely illustrative, and not limitative, of the remainder of the specification and claims in any way whatsoever.

EXAMPLE A

To 1,000 parts by weight of liquid polybutadiene (~79% cis-1,4-double bonds, ~20% trans-1,4-double bonds, and <1% vinyl double bonds, having a viscosity of 156 centipoises at 50° C.) there are added dropwise 2,950 parts by volume of an ethyl acetate solution containing 818 g. peracetic acid, the addition being accomplished at 30–40° C. while stirring the reaction mixture. After a further two hour period of stirring at 30–40° C., the reaction is terminated. The reaction solution is shaken out with dilute sodium hydroxide solution and water in order to remove the acetic acid, and dried over sodium sulfate. After evaporating the solvent in vacuum, there are obtained 1,100 parts by weight of liquid polybutadiene epoxide having an oxygen content of 15.0% (corresponding to a degree of epoxidation of 60% of the double bonds) and a viscosity of 8,200 centipoises at 50° C. The infrared analysis shows a hydroxyl content of 0.5%. Ester, carbonyl, and normal ether groups are not observed in the IR-spectrum. The molecular weight determined by steam pressure osmosis amounts to 1,700.

EXAMPLE B

Example A is repeated except that the epoxidation is conducted with a polybutadiene having the same structure but a viscosity of 190 centipoises at 50° C., and using the stoichiometric quantity of peracetic acid calculated for an oxygen content of 17% (corresponding to a degree of epoxidation of 69% of the double bonds). There is thus obtained a polybutadiene epoxide having an oxygen content of 17.0% and a viscosity of 4,700 centipoises at 50° C.

EXAMPLE C

Example A is repeated, epoxidizing the structurally same polybutadiene but with a viscosity of 140 centipoises at 50° C. to a calculated epoxidation degree of 80% of the double bonds. There is obtained a polybutadiene epoxide with an oxygen content of 19.1%. By quantitative IR-analysis, a hydroxyl content of 1.3% is determined. The viscosity is 97,000 centipoises at 50° C.

Examples A, B and C thus demonstrate that it is possible, in a very simple manner, to adjust the desired degree of epoxidation by adding the calculated quantity of peracid.

To illustrate the improved properties of the hardened polybutadiene epoxy resins of this invention, Examples 1 to 16 are submitted in self-explanatory tabular form, all parts being on a weight basis, unless otherwise indicated.

The abbreviations used in the table are defined as follows:

MA=maleic acid anhydride
HHPA=hexahydrophthalic acid anhydride
MNA=methylnadic acid anhydride (methyl-3,6-endomethylene-1,2,3,6-tetrahydro-cis-phthalic acid anhydride)
Propyl.=propylene glycol
Glyc.=glycerin
Ethyl.=ethylene glycol The mechanical values were measured as follows:
Flexural strength and deflection according to DIN (German Industry Norm) 53,452.
Impact resistance (toughness) according to DIN (German Industry Norm) 53,453.
Ball-thrust resistance (hardness) according to VDE 0302, section 6.
Heat distortion temperature according to Martens, DIN (German Industry Norm) 53,458.

A comparison of Examples 1–11 on the one hand with Examples 12–16 (which latter polymers do not comply with the requirements of this invention) demonstrates that the heat distortion temperature of the hardened polymers of this invention is substantially higher than that of the products manufactured by the heretofore conventional processes, the values for flexural strength, deflection, impact resistance, and hardness remaining at least the same.

The following examples can be repeated with similar success by substituting the generically and specifically described reactants and operating conditions of this invention for those used in the preceding examples.

EXAMPLES 1-16

| Example | Structure of the Polybutadiene Used | Epoxide Oxygen Content (percent) of the Polybutadiene | Viscosity at 50° C., in Centipoises | Parts of Hardener per 100 Parts of Resin | Gelling Time Hrs. | Gelling Time ° C. | Post-Hardening Hrs. | Post-Hardening ° C. | Flexural Strength, Kp/cm.²* | Deflection, mm. | Impact Resistance Toughness, cm. Kp/cm.² | Ballthrust Resistance, 10 sec. Kp/cm.² | Martens Number, ° C. |
|---|---|---|---|---|---|---|---|---|---|---|---|---|---|
| 1 | ~70% cis-1,4, ~20% trans-1,4, <1% Vinyl | 15.0 | 8,200 | 80 HHPA plus 8 Propyl | 2 | 100 | 14 | 160 | 1,285 | 11 | 22 | 1,710 | 130 |
| 1 | do | 15.6 | 14,900 | 80 HHPA plus 8 Propyl | 2 | 90 | 14 | 160 | 1,000 | 7.0 | 9.7 | 1,673 | 130 |
| 2 | do | 15.6 | 14,900 | 100 HHPA plus 8 Propyl | 2 | 90 | 14 | 160 | 953 | 6.8 | 15 | 1,831 | 125 |
| 3 | do | 15.6 | 14,900 | 80 HHPA plus 6 Ethyl | 3 | 125 | 14 | 160 | 600 | 5.5 | 8.5 | 1,675 | 135 |
| 4 | do | 15.6 | 14,900 | 80 MNA plus 3 Propyl | 3 | 125 | 14 | 160 | 710 | 5.5 | 8.0 | 1,725 | 131 |
| 5 | do | 15.6 | 14,900 | 40 MA plus 3 Ethyl | 1 | 125 | 14 | 160 | 310 | 3.6 | 7.0 | 1,570 | >150 |
| 6 | do | 15.6 | 14,900 | 40 MA plus 3 Glyc | 1 | 20 | 14 | 160 | 205 | 2.1 | 4.0 | 1,590 | >150 |
| 7 | do | 15.6 | 14,900 | 40 MA plus 5 Maleic Acid | At once | 20 | 14 | 160 | 510 | 4 | 3.5 | 1,780 | 141 |
| 8 | do | 17.0 | 47,000 | 80 HHPA plus 8 Propyl | 1.5 | 110 | 14 | 160 | 745 | 6.2 | 5.4 | 1,810 | >150 |
| 9 | do | 19.1 | 97,000 | 80 HHPA plus 8 Propyl | 2 | 80-100 | 14 | 160 | 855 | 6.7 | 8.5 | 1,350 | 145 |
| 10 | do | 19.1 | 97,000 | 40 MA plus 7.9 Propyl | 1 | 120 | 14 | 160 | 730 | 5.5 | 8.5 | 1,780 | 101 |
| 11 | do | 13.1 | 3,250 | 80 HHPA plus 8 Propyl | 2 | 110 | 14 | 160 | 800 | 6.7 | 6.7 | 1,550 | 101 |
| 12 | ~39% cis-1,4, ~17% trans-1,4, <44% Vinyl | 14.1 | 8,300 | 80 HHPA plus 8 Propyl | 2 | 110-120 | 14 | 160 | 870 | 6.4 | 9.5 | 1,680 | 110 |
| 13 | do | 12.8 | 21,800 | 80 HHPA plus 8 Propyl | 2 | 110-120 | 14 | 160 | 900 | 7.5 | 10 | 1,550 | 102 |
| 14 | do | 14.1 | 43,900 | 80 HHPA plus 8 Propyl | 2 | 110-120 | 14 | 160 | 600 | 5.5 | 8.5 | 1,632 | 115 |
| 15 | Oxiron 2000 | 13.4 | 15,700 | 80 HHPA plus 8 Propyl | 1 | 125 | 14 | 160 | 950 | 6.6 | 8.2 | 1,620 | 104 |

*1 Kp=Kilopond. (1 Kp means the power by which the mass of 1 kg. is attracted by the earth in 45° of latitude—in Paris—Literature: Heywang-Nücke-Timm, "Physik für Techniker," Verlag Handwerk und Technik Hamburg, 4. Auflage (1964), Seite 9.)

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A hardened polymer comprising an agent selected from the group consisting of polybasic carboxylic acid and a polybasic carboxylic acid anhydride, and an epoxy resin consisting essentially of an epoxidized polybutadiene having a degree of epoxidation of at least 60% of the double bonds, corresponding to at least 15% by weight of oxygen, and being produced from a liquid polybutadiene having at least 60% of its double bonds in the cis-configuration and a molecular weight of about 250 to 25,000.

2. A hardened polymer as defined by claim 1 wherein the polybutadiene has at least 70% of its double bonds in the cis-configuration.

3. A hardened polymer as defined by claim 1 wherein the ratio of hardener of epoxy resin corresponds to 0.6–1 equivalent of reactive hydrogen per epoxide group.

4. A hardened polymer as defined by claim 2 wherein the ratio of hardener to epoxy resin corresponds to 0.6–1 equivalent of reactive hydrogen per epoxide group.

5. A hardened polymer as defined by claim 3 wherein said hardener contains a polyhydric alcohol.

6. A hardened polymer as defined by claim 4 wherein said hardener contains a polyhydric alcohol.

7. A hardened polymer as defined by claim 3 wherein said hardener is a mixture of said polybasic carboxylic acid anhydride and a polyhyric alcohol.

8. A hardened polymer as defined by claim 4 wherein said hardener is a mixture of said polybasic carboxylic acid anhydride and a polyhydric alcohol.

9. A hardened polymer as defined by claim 7 wherein the polybasic carboxylic acid anhydride is maleic acid anhydride, hexahydrophthalic acid anhydride, or methylnadic acid anhydride, and said polyhydric alcohol is propylene glycol, glycerin, or ethylene glycol.

10. A hardened polymer as defined by claim 8 wherein the polybasic carboxylic acid anhydride is maleic acid anhydride, hexahydrophthalic acid anhydride, or methylnadic acid anhydride, and said polyhydric alcohol is propylene glycol, glycerin, or ethylene glycol.

11. A hardened polymer as defined by claim 1, wherein said agent is oxalic acid, succinic acid, adipic acid, sebacic acid, decamethylene dicarboxylic acid, malic acid, tartaric acid, fumaric acid, maleic acid, tetrahydrophthalic acid, hexahydrophthalic acid, endomethylene tetrahydrophthalic acid, phthalic acid, trimellitic acid, pyromellitic acid, tetrachlorophthalic acid, hexachloro-indomethylene-tetrahydrophthalic acid, maleic acid anhydride, succinic acid anhydride, tetrahydrophthalic acid anhydride, endomethylene-tetrahydrophthalic acid anhydride, hexahyrophthalic acid anhydride, and hexachloro-endomethylene-tetrahydrophthalic acid anhydride.

12. A hardened polymer as defined by claim 5 wherein said polyhydric alcohol is ethylene glycol, propylene glycol, diethylene glycol, 1,4-butanediol, glycerin, and erythritol.

References Cited

UNITED STATES PATENTS 3,030,336  4/1962  Greenspan et al. _____ 260—47
3,253,000  5/1966  Kirchhof et al. _____ 260—348

JOSEPH L. SCHOFER, *Primary Examiner.*

C. A. HENDERSON, JR., *Assistant Examiner.*

U.S. Cl. X.R.

260—94.7, 2, 348